(12) United States Patent
Yoo et al.

(10) Patent No.: US 7,519,267 B2
(45) Date of Patent: *Apr. 14, 2009

(54) METHOD AND APPARATUS FOR CREATING SEARCH INFORMATION FOR RECORDED DIGITAL BROADCAST STREAMS

(75) Inventors: Jea-Yong Yoo, Seoul (KR); Byung-Jin Kim, Kyunggi-do (KR); Kang-Soo Seo, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1168 days.

This patent is subject to a terminal disclaimer.

(21) Appl. No.: 10/163,911

(22) Filed: Jun. 4, 2002

(65) Prior Publication Data

US 2002/0150385 A1 Oct. 17, 2002

Related U.S. Application Data

(63) Continuation of application No. 09/416,893, filed on Oct. 13, 1999, now Pat. No. 6,993,247.

(30) Foreign Application Priority Data

Oct. 13, 1998 (KR) .................................. 98-43263

(51) Int. Cl.
*H04N 5/91* (2006.01)
(52) U.S. Cl. ............................ 386/68; 386/70; 386/95; 386/125
(58) Field of Classification Search .................. 386/95, 386/125, 126, 68, 70, 83
See application file for complete search history.

(56) References Cited

U.S. PATENT DOCUMENTS

| | | | |
|---|---|---|---|
| 5,535,008 A * | 7/1996 | Yamagishi et al. | 386/109 |
| 5,596,564 A | 1/1997 | Fukushima et al. | |
| 5,596,581 A | 1/1997 | Saeijs et al. | |
| 5,619,337 A | 4/1997 | Naimpally | |
| 5,737,479 A | 4/1998 | Jujinami | |
| 5,838,873 A * | 11/1998 | Blatter et al. | 375/240.25 |
| 5,902,115 A | 5/1999 | Katayama | |
| 5,909,257 A * | 6/1999 | Ohishi et al. | 725/50 |
| 6,035,095 A | 3/2000 | Kaneshige | |
| 6,169,843 B1 * | 1/2001 | Lenihan et al. | 386/95 |
| 6,181,870 B1 | 1/2001 | Okada | |
| 6,385,394 B1 * | 5/2002 | Okada et al. | 386/95 |
| 6,470,135 B1 * | 10/2002 | Kim et al. | 386/68 |
| 6,512,882 B1 * | 1/2003 | Teunissen | 386/95 |
| 6,925,247 B2 * | 8/2005 | Kim et al. | 386/68 |
| 6,993,247 B1 * | 1/2006 | Yoo et al. | 386/68 |

* cited by examiner

*Primary Examiner*—Vincent F Boccio
(74) *Attorney, Agent, or Firm*—Lee, Hong, Degerman, Kang & Waimey

(57) ABSTRACT

A method and apparatus for automatically creating a play list of a received digital broadcast stream to be recorded on a recording medium. Specific positions of the received broadcast stream in which the packet identification code contained in the received stream changes are detected and recorded as entry points of programs. A play list can be automatically created based upon the detected entry points, thereby enabling a user to easily locating start positions of recorded programs.

19 Claims, 5 Drawing Sheets

METHOD AND APPARATUS FOR CREATING SEARCH INFORMATION FOR RECORDED DIGITAL BROADCAST STREAMS

This is a continuation of application Ser. No. 09/416,893 filed Oct. 13, 1999 now U.S. Pat. No. 6,993,247, which application is hereby incorporated by reference in its entirety.

BACKGROUND OF THE INVENTION

1. Field of the Invention

The present invention relates to a method and apparatus for automatically creating a play list of a received digital broadcast stream by detecting specific entry points of the received digital broadcast stream while recording the received digital broadcast stream on a recording medium.

2. Description of the Related Art

In conventional analog television broadcast, video signals are transmitted over the air or through cables after being AM or FM modulated. With the recent rapid advance of digital technologies such as digital image compression or digital modulation/demodulation, standardization for digital television broadcast is in rapid progress. Based upon the Moving Picture Experts Group (MPEG) format, satellite and cable broadcast industry also moves towards digital broadcast.

Digital broadcast offers several advantages that its analog counterpart cannot provide. For example, digital broadcast is capable of providing services with far more improved video/audio quality, transmitting several different programs within a fixed bandwidth, and offering enhanced compatibility with digital communication media or digital storage media.

In digital broadcast, a plurality of programs encoded based upon the MPEG format are multiplexed into a transport stream before transmitted. The transmitted transport stream is received by a set top box at the receiver and demultiplexed into a plurality of programs. If a program is chosen from among the demultiplexed programs, the chosen program is decoded by a decoder in the set top box and original audio and video signals are retrieved. The retrieved audio and video signals can be presented by an A/V output apparatus such as a TV.

It is also possible to store the received digital broadcast signals on a storage medium instead of directly outputting the received broadcast signals to A/V output devices. The stored digital broadcast signals can be edited and retrieved afterwards. For example, a digital data stream received by a set top box can be stored in a streamer such as a digital video disk (DVD) recorder through communication interfaces like an IEEE-1394 serial bus. Later, the stored digital data stream can be edited and transmitted back to the set top box so that the original digital audio and video data can be presented.

In the instance where a received digital broadcast stream is recorded on a recording medium, it is necessary to develop schemes for collecting position information that enables random access to the recorded stream, creating navigation information regarding the recorded stream, and automatically generating a play list indicative of the play sequence of arbitrary intervals of the recorded stream.

SUMMARY OF THE INVENTION

It is an object of the present invention to provide a method and apparatus for automatically creating a play list of a received digital broadcast stream based upon random access entry points detected while the received broadcast stream is recorded on a recording medium.

The method for creating search information in accordance with the invention comprises detecting a change of program identification information contained in a digital transport stream received as a series of digital transport stream units and creating and recording position information for accessing the recording positions of the transport stream units whose program identification information shows a change in the previous step.

The method for searching a recorded data stream using the search information created in accordance with the invention comprises retrieving position information corresponding to each recorded program, the position information having been created and recorded based upon a change of program identification information of the recorded programs and accessing the entry point to an arbitrary program based upon the retrieved position information.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In sequence that the invention may be fully understood, preferred embodiments thereof will now be described with reference to the accompanying drawings.

Figure 1:
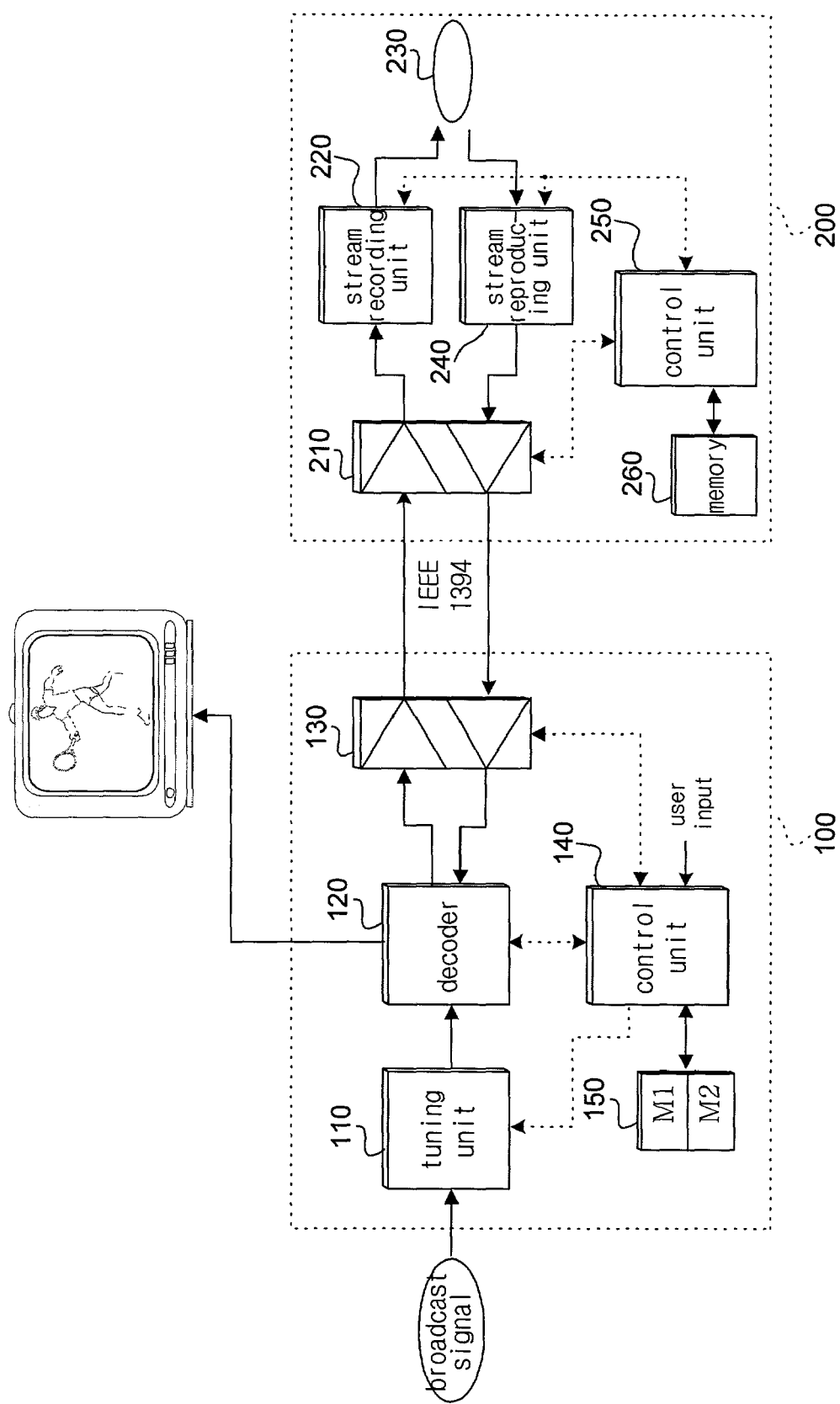
FIG. 1 is a block diagram of an apparatus in which the present invention can be advantageously employed.

FIG. 1 depicts a block diagram of an apparatus in which the method for creating search information in accordance with the present invention can be advantageously employed. The apparatus comprises a set top box 100, a communication interface (IEEE-1394), and a streamer 200.

The set top box 100 receives transport streams encoded by system encoders and broadcast by a plurality of broadcast stations and demultiplexes the received transport streams. After a decoder 120 decodes the transport stream of a program tuned by a tuning unit 110, a control unit 140 outputs the decoded transport stream to an A/V output apparatus or to the streamer 200 through the IEEE-1394 communication interface for recording the transport stream.

In the set top box 100, the program specific information (PSI) contained in the transport stream of the program tuned by the tuning unit 110 is decoded by the decoder 120 and transmitted to the control unit 140. Control unit 140 stores the program specific information (PSI) in the program information area (M1) of a memory 150. The program specific information (PSI) includes information on all programs of every received channel, such as transport channel numbers, channel names, program names, schedules, program categories, attributes of streams constituting each program, etc.

The control unit 140 may constitute a program table having a time axis and channel axis using the program specific information (PSI) stored in the program information area M1 of the memory 150 and display the program table on a television screen.

The set top box 100 may transmit a program chosen by a user through the IEEE-1394 interface to the streamer 200 so that the transmitted program is recorded on a recording medium 230 such as a digital video disk by the streamer 200.

In addition, requested by a user, the set top box 100 may receive a program retrieved from recording medium 230 by the streamer 200 through the IEEE-1394 communication interface so that the received program can be presented on a television after being decoded by the decoder 120.

For carrying out these tasks, the set top box 100 and the streamer 200 should be able to access the management information regarding the programs recorded on the recording medium. To this end, the apparatus has an application information file utilized only by the set top box 100, a streamer information file utilized only by streamer 200, and a common information file utilized by both the set top box 100 and the streamer 200. These information files have been recorded on recording medium 230 and used for managing programs recorded on recording medium 230.

The application information file is retrieved by a stream reproducing unit 240 in streamer 200 while set top box 100 is initialized and transmitted to set top box 100 through the IEEE-1394 communication interface. The transmitted application information file is loaded into the navigation information area M2 of memory 150. Each time a new program is recorded on the recording medium, the memory content is updated to include management information on the newly recorded program by control unit 140. If a user requires a recorded program to be presented, control unit 140 requests streamer 200 to retrieve the program, with reference to the application information file that resides in memory 150. When set top box 100 terminates a recording task or is shut down, the application information file loaded in memory 150 is transmitted through the IEEE-1394 communication interface to streamer 200 and recorded on recording medium 230 by a stream recording unit 230 controlled by a control unit 250.

The streamer information file and common information file are retrieved by a stream reproducing unit 240 in the streamer 200 while the streamer 200 is initialized and loaded into a memory 260. Each time a new program is recorded on the recording medium, the memory content is updated to include management information on the newly recorded program by the control unit 250. If a user requires a recorded program to be presented, the control unit 250 responsive to a signal from the set top box 100 retrieves the associated program recorded on recording medium 230 with reference to the information files loaded in the memory 260. When the set top box 100 terminates a recording task or is shut down, the information files in the memory 260 are recorded on recording medium 230 by a stream recording unit 220 controlled by the control unit 250.

Figure 2:
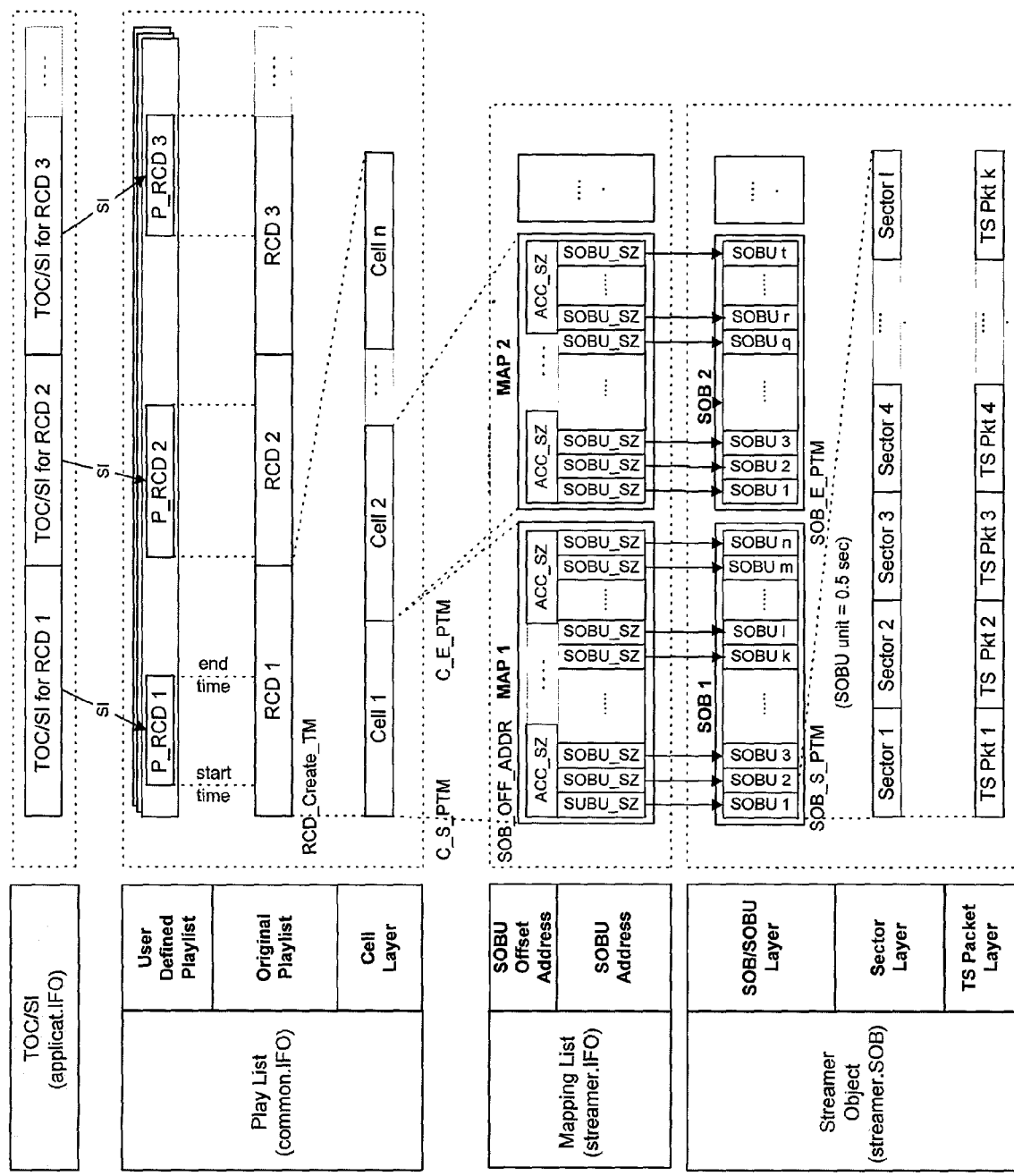
FIG. 2 is a pictorial representation showing the structure of relevant information files and recorded data in accordance with the present invention.

The syntax of the information files and the structure of recorded data in accordance with an embodiment of the present invention will be explained with reference to FIG. 2.

An application information file (application.IFO) contains a table of content (TOC) and a service information (SI) table. The TOC contains entry points for enabling random access to the recorded broadcast stream and the SI table contains the information on the recorded broadcast stream. The entry points are created by detecting the points wherein the packet ID (PID) contained in each transport stream packet constituting the broad stream changes or the points having random access indicators. The SI table is created using the program specific information (PSI).

A common information file (common.IFO) contains an original play list automatically created when the broadcast stream is recorded, a cell layer comprising a plurality of cells, and a user-defined play list created when a user edits the presentation sequence of the recorded broadcast stream.

A streamer information file (streamer.IFO) deals with a mapping list which is addresses of stream object units (SOBs) recorded on the recording medium. The mapping list comprises a plurality of maps (MAP1, MAP2, . . . ), with each map having a one-to-one correspondence with each cell. A map further comprises a stream object unit offset address and a stream object address. For example, the stream object offset address consists of access sizes (ACC_SZs), each size being corresponding to a 10 sec-long amount of data stream, and stream object address consists of stream object unit sizes (SOBU_SZs), each size being corresponding to a 0.5 sec-long amount of data stream. In this case, the mapping list allows recorded streams to be accessed by the unit of 0.5 s.

A streamer data file (streamer.SOB) is a data file in which the data stream corresponding to the maps is recorded. The recorded data comprises a SOB/SOBU layer consisting of stream object units, each unit being corresponding to each stream object unit size (SOBU_SZ), a sector layer consisting of a plurality of sectors (Sector 1~Sector 1) constituting stream object units (SOBUs), and a transport stream packet layer consisting of a plurality of transport stream packets (TS Pkt 1~PS Pkt k) contained in each sector.

The method for creating search information for a recorded digital broadcast stream in accordance with the invention will be explained with reference to FIGS. 1 and 2.

If a user asks for recording a received broadcast stream on a recording medium, the control unit 140 of the set top box 100 informs the control unit 250 of the streamer 200 that a recording mode is set and begins to transmit the received broadcast stream to the streamer 200 through the IEEE-1394 interface. And the control unit 140 of the set top box 100 detects special stream positions in which the packet ID (PID) contained in each transport stream packet constituting the broadcast stream changes or the points having random access indicators. The detected positions are recorded as entry points in the TOC of the application information file (application-.IFO) loaded in the navigation information area M2 of the memory 150. The position information is expressed in terms of the packet arrival times of the associated transport stream packets. The position information is recorded in the reproduction management information area of the associated stream object (SOB) on the recording medium, the reproduction management information comprising cell information and cell layer information, etc. When retrieving a stream object (SOB), the position information is loaded into the memory 260 and used as entry point information of the associated stream object (SOB) by the control unit 140, thereby allowing rapid access to the positions.

The information on the broadcast stream being currently recorded is obtained from the program specific information (PSI) loaded in program information area M1 of the memory 150 and recorded in the service information (SI) table of the application information file (application.IFO).

Meanwhile, the control unit 250 of the streamer 200 controls the broadcast stream received through the IEEE-1394 interface to be recorded on the recording medium 230 by the stream recording unit 220. Using an internal clock synchronized with the time reference information contained in the transport stream packets of the received broadcast stream, the control unit 230 groups the broadcast stream received for 0.5 s into a stream object unit (SOBU) and records the created stream object unit (SOBU) in the streamer data file (streamer.SOB) after rearranging data streams stored temporally in the memory 26. Also, the stream object unit size (SOBU_SZ) corresponding to the created stream object unit (SOBU) is created and recorded in the SOBU address table of the streamer information file (streamer.IFO) loaded in the memory 260. If 20 stream object units (SOBUs) are created after 10 s elapses, control unit 230 creates an access size (ACC_SZ) and records the created access size (ACC_SZ) in the stream object unit (SOBU) offset address table of the streamer information file (streamer.IFO) loaded in the memory 260.

The aforementioned procedure is repeated until the recording mode ends and finally a record (RCD) is created. If the recording mode ends, the control unit 250 groups the created stream object units into a stream object (SOB) in the streamer data file (streamer.SOB). Also, the recorded access sizes (ACC_SZs) and stream object unit sizes (SOBU_SZs) are grouped into a map and recorded in the streamer information file (streamer.IFO).

Figure 3:
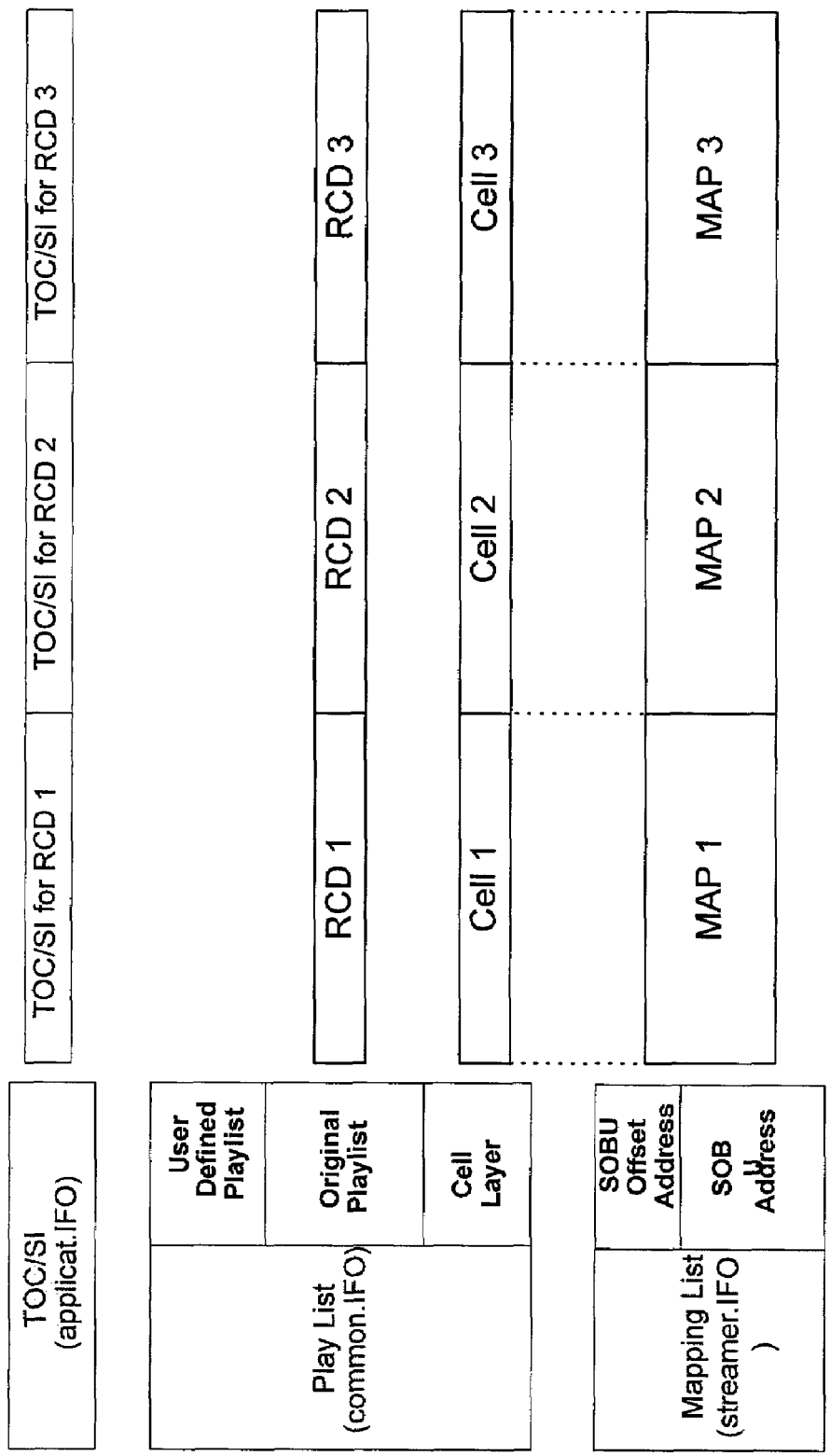
FIGS. 3 and 4 are pictorial representations for explaining the method for creating a play list in accordance with an embodiment of the present invention.

Next, the control unit 250 of the streamer 200 creates presentation sequence information (Cell 1) pertaining to the created map and records the created cell (Cell 1) as presentation sequence information corresponding to the record (RCD 1) in the original play list of the common information file (common.IFO), as shown in FIG. 3.

The updated files (application.IFO, common.IFO, and streamer.IFO) are recorded on the recording medium when the recording of the digital data stream is terminated.

The subsequent records (RCD2, RCD3) can be created in the same way as done so far by the control unit 140 of the set top box 100 and the control unit 250 of the streamer 200.

Figure 4:
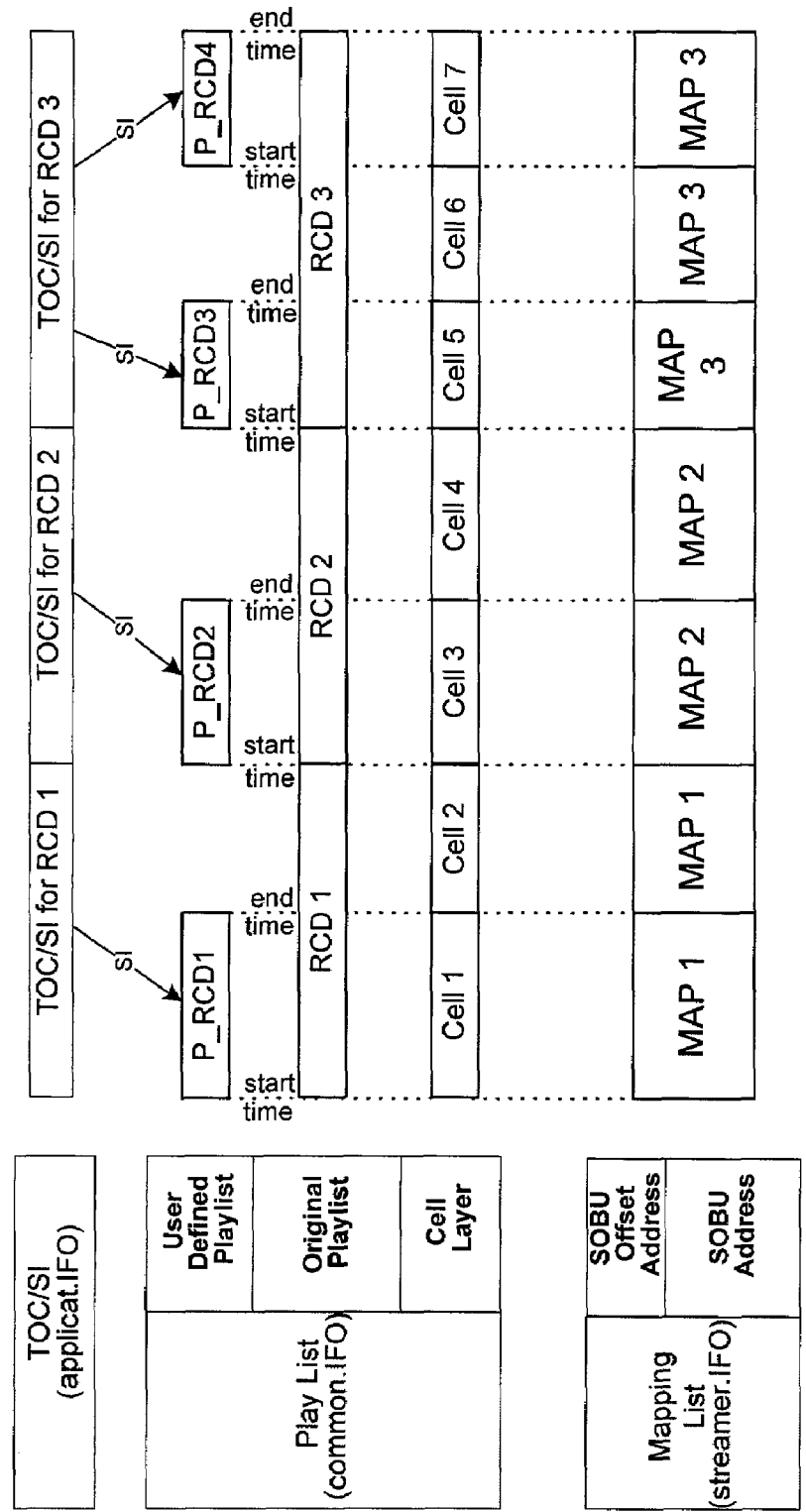
Figure 5:
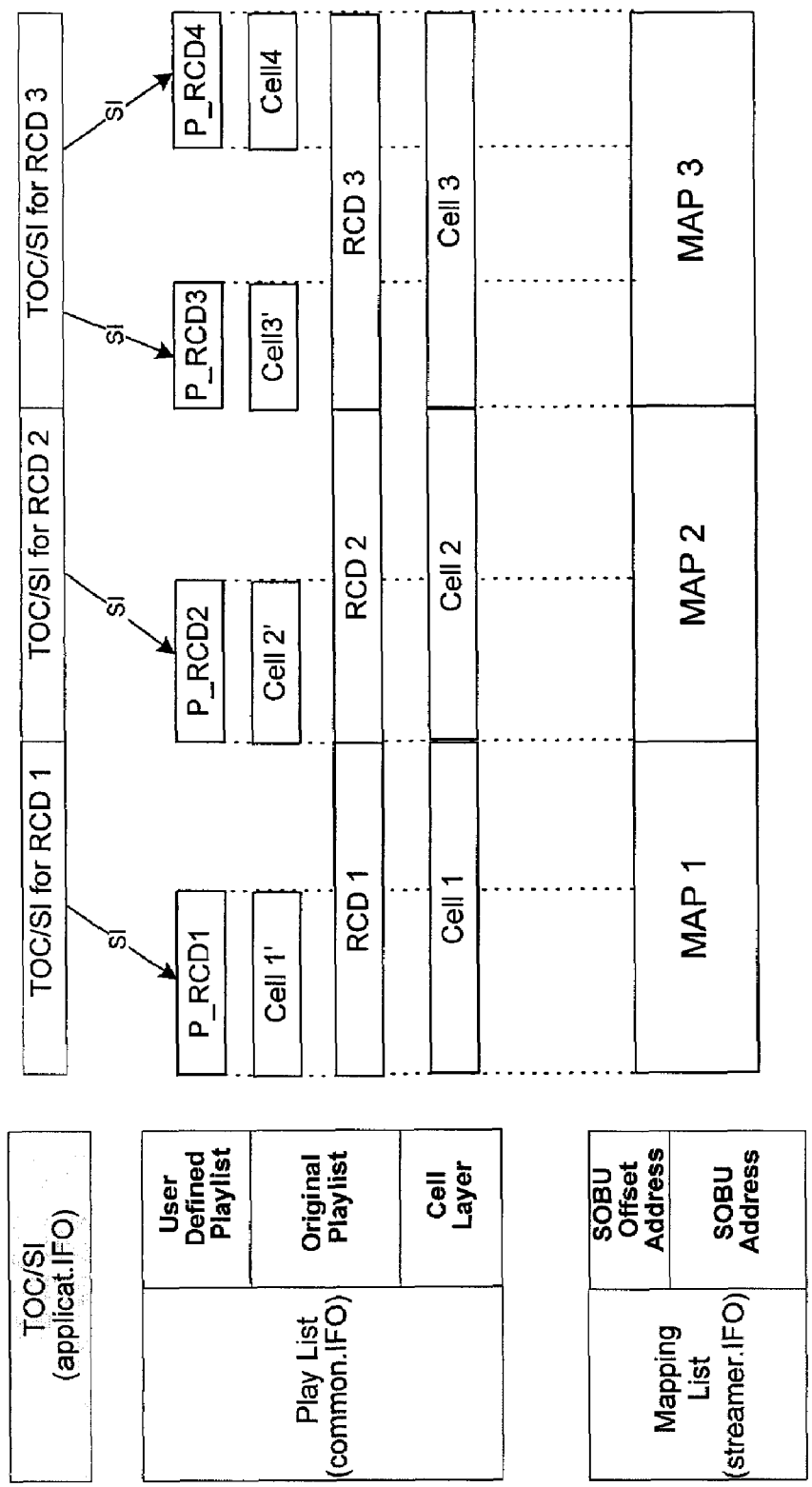
FIG. 5 is a pictorial representation for explaining the method for creating a play list in accordance with another embodiment of the present invention.

Suppose that the created records (RCD 1, RCD 2, RCD 3) have been recorded as shown in FIG. 3 and a request for creating a user-defined play list is received. Referring to the service information (SI) table of the application information file (application.IFO), the control unit 140 of the set top box 100 transmits the start time and end time of the record RCD 1 to the control unit 250 of the streamer 200 through the IEEE-1394 communication interface. Based on the start time and end time, the control unit 250 of the streamer 200 divides the presentation sequence information (Cell) corresponding to RCD 1 into two cells (Cell 1 and Cell 2) and records Cell 1 and Cell 2 as presentation sequence information corresponding to RCD1 in the original play list, as shown in FIG. 4. In addition, the control unit 250 records Cell 1 as presentation sequence information corresponding to the user-defined record section (P_RCD 1) in the user-defined play list. Presentation sequence information about the other user-defined record sections (P_RCD 2, P_RCD 3, P_RCD 4) are created in the same manner so that the original play list of the common information file (common.IFO) is updated and presentation sequence information (Cell) corresponding to the user-defined record sections (P_RCD 2, P_RCD 3, P_RCD 4) in the user-defined play list are created and recorded.

The way the presentation sequence information (Cell) is divided is as follows. The control unit 250 searches for packet arrival times of the transport stream packets corresponding to the start time and end time of the record RCD 1 and detects the associated transport stream packets. The presentation sequence information (Cell) is divided based upon the detected transport stream packets.

The method for creating search information for a recorded digital broadcast stream in accordance with another embodiment of the invention will be explained.

Unlike the previous embodiment in which a cell is created for a record, cells are created in a different way in this embodiment to be explained. Referencing the service information (SI) table of the application information file (application.IFO) in a recording mode, the control unit 140 of set top box 100 detects the start and end positions of each program contained in a received broadcast stream and transmits the position information to the control unit 250 of the streamer 200 through the IEEE-1394 communication interface. With reference to the received position information, the control unit 250 of the streamer 200 separates the recorded broadcast stream into programs and commercials contained in between each program and creates cells for each separated group. Or when a record is recorded on the recording medium, the control unit 250 of the streamer 200 creates cells for each program using position information on entry points to the programs, the position information having been generated based upon a change of program identification information of the recorded programs.

With this scheme, it can be prevented to divide a cell into two when a user edits a user-defined play list. In this embodiment, however, a cell should be also divided into two if a program is divided and contained in a cell.

The present invention is not restricted only to the apparatus explained with reference to FIG. 1. The present invention can be employed in any system comprising a subsystem functioning a set top box and another subsystem functioning as streamer and a communication interface between the two systems.

According to the method and apparatus for creating search information for a recorded digital broadcast stream, management information on a digital broadcast stream is recorded while the stream is recorded on a recording medium. Also, a play list of the recorded digital broadcast stream can be created using the service information of digital broadcast programs.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for recording stream packets containing program information on a recording medium, the method comprising:
   detecting a change in a program attribute from a sequence of MPEG transport stream packets;
   distinguishing and recording the sequence of the stream packets in response to the change in the program attribute;
   creating a mapping list associating map units with corresponding addresses for searching received MPEG transport stream data recorded on the recording medium, wherein each map unit has a fixed time length; and
   recording the addresses corresponding to the map units in the mapping list.

2. The method of claim 1, wherein the program attribute is included in a packet identifier (PID) of the stream packets.

3. The method of claim 2, wherein the packet identifier is in program specific information (PSI) of the stream packets.

4. The method of claim 1, wherein the step of recording the stream packets by distinguishing the program attribute allows random access to recorded sequence of the stream packets.

5. The method of claim 1, wherein the program attribute is in program specific information of the stream packets.

6. The method of claim 1, wherein beginning of a new program attribute in the sequence of the stream packets corresponds to position information generated based upon a change of program identification information of a recorded program.

7. The method of claim 1, further comprising
recording an entry point on the recording medium corresponding to the change in the program attribute in the sequence of the stream packets.

8. A recording apparatus for recording stream packets containing program information, the apparatus comprising:
means for detecting a change in a program attribute from a sequence of the stream packets;
means for distinguishing and recording the sequence of the stream packets in response to the change in the program attribute;
means for creating a mapping list associating map units with corresponding addresses for searching received MPEG transport stream data recorded on the recording medium, wherein each map unit has a fixed time length; and
means for recording the addresses corresponding to map units in the mapping list.

9. The recording apparatus of claim 8, wherein the program attribute is included in a packet identifier (PID) of the stream packets.

10. The recording apparatus of claim 9, wherein the packet identifier is in program specific information (PSI) of the stream packets.

11. The recording apparatus of claim 8, wherein the program attribute is in program specific information of the stream packets.

12. The recording apparatus of claim 8, wherein beginning of a new program attribute in the sequence of the stream packets corresponds to position information generated based upon a change of program identification information of a recorded program.

13. The recording apparatus of claim 8, further comprising
means for recording an entry point corresponding to the change in the program attribute in the sequence of the stream packets.

14. A digital recording apparatus for use with a recording medium for recording stream packets containing program information, the apparatus comprising:
a decoder configured to decode MPEG transport stream data into stream packets;
a control unit connected to the decoder and configured to detect a change in a program attribute from a sequence of the stream packets, distinguish the sequence of the stream packets in response to the change in the program attribute, and create a mapping list associating map units with corresponding addresses for searching MPEG transport stream data recorded on the recording medium, wherein each map unit has a fixed time length; and
a stream recording unit that records the stream packets corresponding to the change in the program attribute and records the addresses corresponding to map units in the mapping list in response to the control unit.

15. The digital recording apparatus of claim 14, wherein the program attribute is included in a packet identifier (PID) of the stream packets.

16. The digital recording apparatus of claim 15, wherein the packet identifier is in program specific information (PSI) of the stream packets.

17. The digital recording apparatus of claim 14, wherein the program attribute is in program specific information of the stream packets.

18. The digital recording apparatus of claim 14, wherein beginning of a new program attribute in the sequence of the stream packets corresponds to position information generated based upon a change of program identification information of a recorded program.

19. The digital recording apparatus of claim 14, wherein the stream recording unit records an entry point corresponding to the change in the program attribute in the sequence of the stream packets.

* * * * *